(12) United States Patent
Kim et al.

(10) Patent No.: US 12,418,077 B2
(45) Date of Patent: Sep. 16, 2025

(54) BATTERY PACK INCLUDING CLIP TYPE CONNECTOR

(71) Applicant: LG ENERGY SOLUTION, LTD., Seoul (KR)

(72) Inventors: Jae Hyung Kim, Daejeon (KR); Dae Ho Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 522 days.

(21) Appl. No.: 17/802,415

(22) PCT Filed: May 13, 2021

(86) PCT No.: PCT/KR2021/006013
§ 371 (c)(1),
(2) Date: Aug. 25, 2022

(87) PCT Pub. No.: WO2021/246676
PCT Pub. Date: Dec. 9, 2021

(65) Prior Publication Data
US 2023/0091858 A1  Mar. 23, 2023

(30) Foreign Application Priority Data
Jun. 1, 2020 (KR) .................. 10-2020-0066048

(51) Int. Cl.
*H01M 50/503* (2021.01)
*H01M 50/514* (2021.01)
*H01M 50/519* (2021.01)
(52) U.S. Cl.
CPC ....... *H01M 50/503* (2021.01); *H01M 50/514* (2021.01); *H01M 50/519* (2021.01); *H01M 2220/30* (2013.01)

(58) Field of Classification Search
CPC ............. H01M 50/503; H01M 50/519; H01M 50/514; H01M 2220/30
See application file for complete search history.

(56) References Cited

U.S. PATENT DOCUMENTS

| | | | |
|---|---|---|---|
| 4,181,387 A | 1/1980 | Walters | |
| 6,394,823 B1 | 5/2002 | Dunham et al. | |

(Continued)

FOREIGN PATENT DOCUMENTS

| | | |
|---|---|---|
| CN | 102474032 A | 5/2012 |
| JP | 62-254373 A | 11/1987 |

(Continued)

OTHER PUBLICATIONS

JP2019021594 translation (Year: 2019).*

(Continued)

*Primary Examiner* — Jane J Rhee
(74) *Attorney, Agent, or Firm* — Birch, Stewart, Kolasch & Birch, LLP

(57) ABSTRACT

Discussed is a battery pack including: a plurality of battery cells; a case configured to receive the plurality of battery cells therein; a connector configured to electrically connect the battery pack to a device; and a printed circuit board (PCB) configured to control operation of the battery pack, the PCB being located inside or outside the case, and the connector being coupled to the PCB, wherein the connector comprises: a clip portion configured to form a first contact point at which the connector electrically contacts a device pin inserted into the connector; and a contact arm having one side connected to the clip portion, the contact arm being configured to form a second contact point having a distance to the device pin varying in inverse proportion to a distance to the device pin at the first contact point.

16 Claims, 6 Drawing Sheets

(56) References Cited

U.S. PATENT DOCUMENTS

| | | |
|---|---|---|
| 2002/0000786 A1 | 1/2002 | Choi et al. |
| 2008/0061738 A1 | 3/2008 | Hanawa et al. |
| 2010/0291434 A1 | 11/2010 | Byun et al. |
| 2012/0315804 A1 | 12/2012 | Wang et al. |
| 2013/0059484 A1 | 3/2013 | Kang et al. |
| 2014/0302369 A1 | 10/2014 | Naito |

FOREIGN PATENT DOCUMENTS

| | | |
|---|---|---|
| JP | 2002-25518 A | 1/2002 |
| JP | 2008-66148 A | 3/2008 |
| JP | 2009-187953 A | 8/2009 |
| JP | 2013-529362 A | 7/2013 |
| JP | 2013-196816 A | 9/2013 |
| JP | 2013-196817 A | 9/2013 |
| JP | 2014-203662 A | 10/2014 |
| JP | 2019-21594 A | 2/2019 |
| KR | 20-1998-0043980 U | 9/1998 |
| KR | 20-0125157 Y1 | 5/1999 |
| KR | 10-2003-0080871 A | 10/2003 |
| KR | 10-2013-0040916 A | 4/2013 |
| KR | 10-1476301 B1 | 12/2014 |
| KR | 10-2016-0031207 A | 3/2016 |
| KR | 10-2016-0125219 A | 10/2016 |
| KR | 10-2016-0125629 A | 11/2016 |
| WO | WO 2011/143807 A1 | 11/2011 |

OTHER PUBLICATIONS

International Search Report (PCT/ISA/210) issued in PCT/KR2021/006013, dated Aug. 19, 2021.
European Communication pursuant to Article 94(3) EPC for European Application No. 21818339.0, dated Jul. 2, 2025.

* cited by examiner

[FIG. 1] RELATED ART
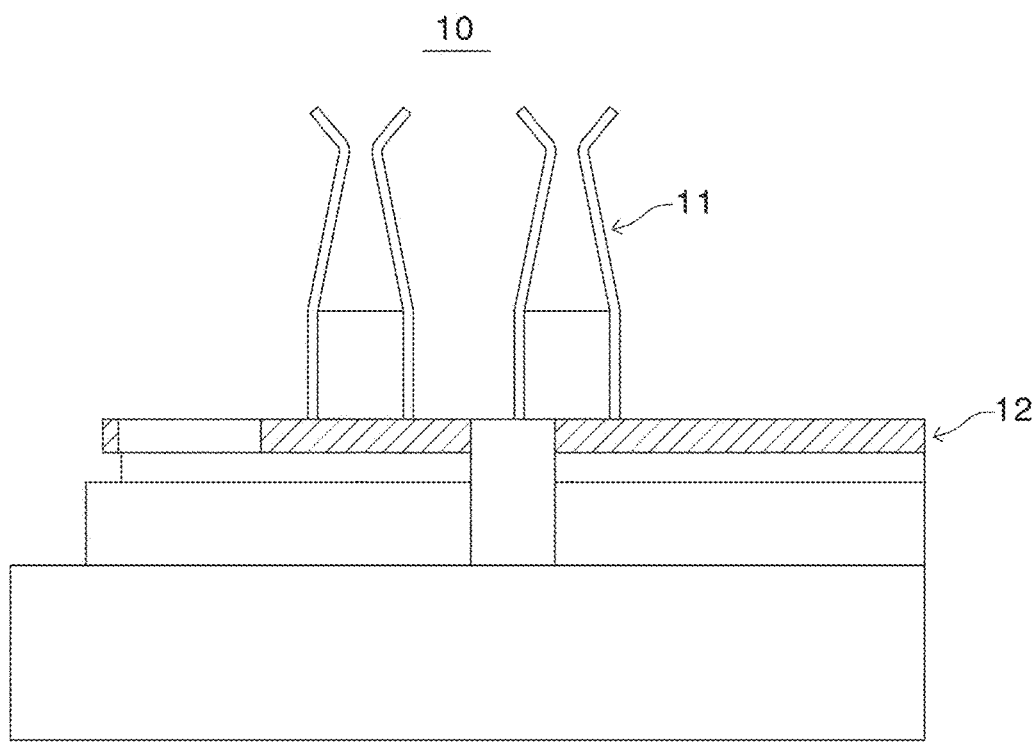

[FIG. 2]   RELATED ART
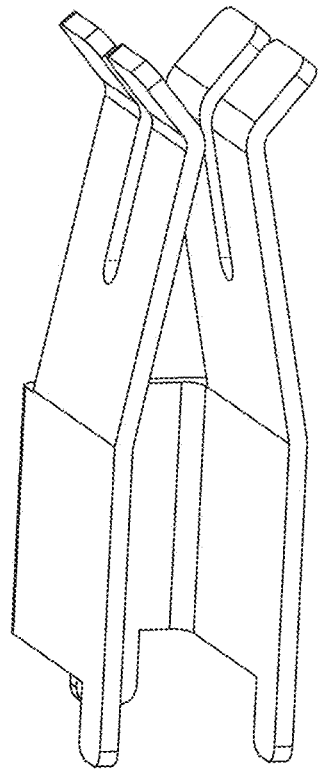
(a)
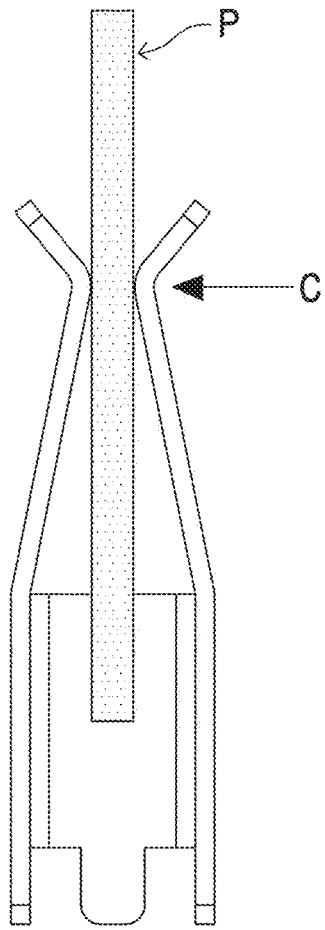
(b)

[FIG. 3]
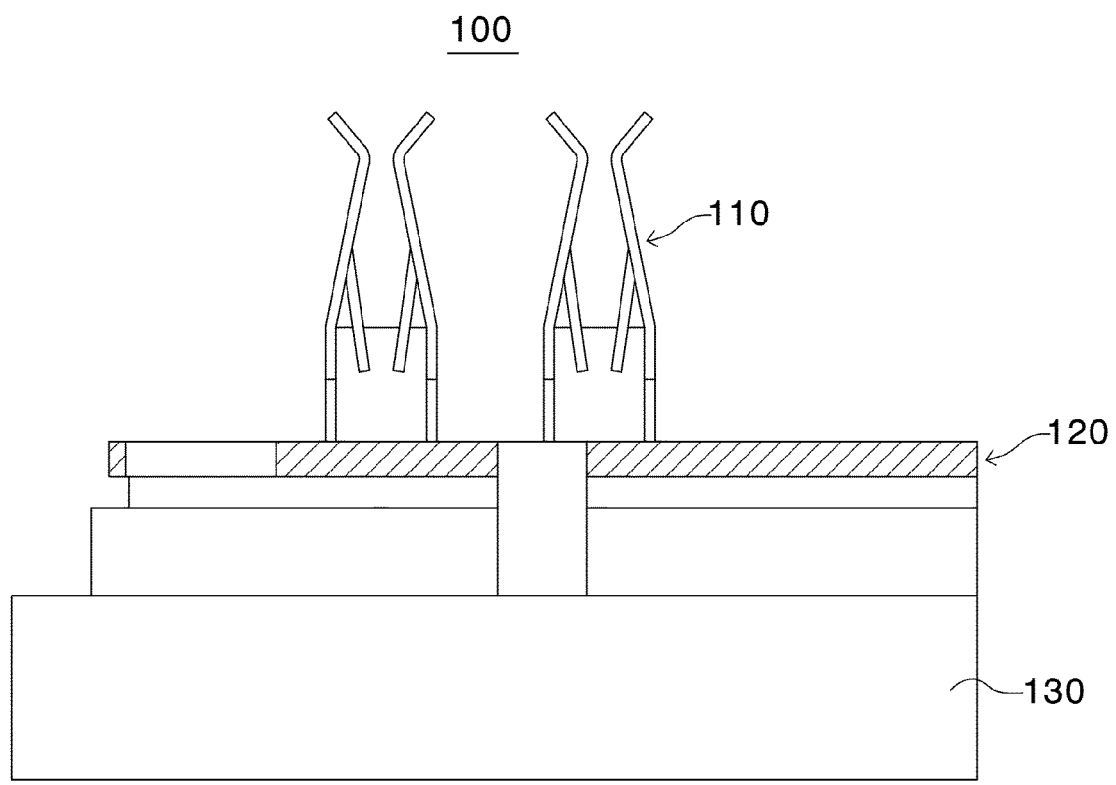

[FIG. 4]
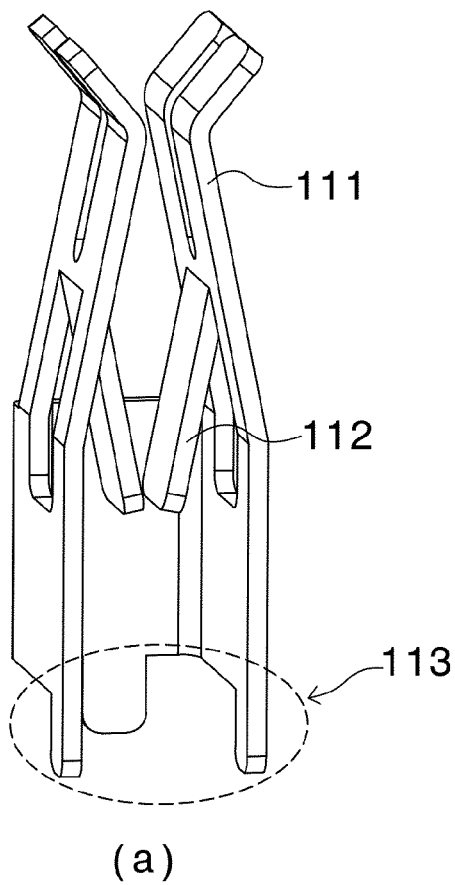
(a)
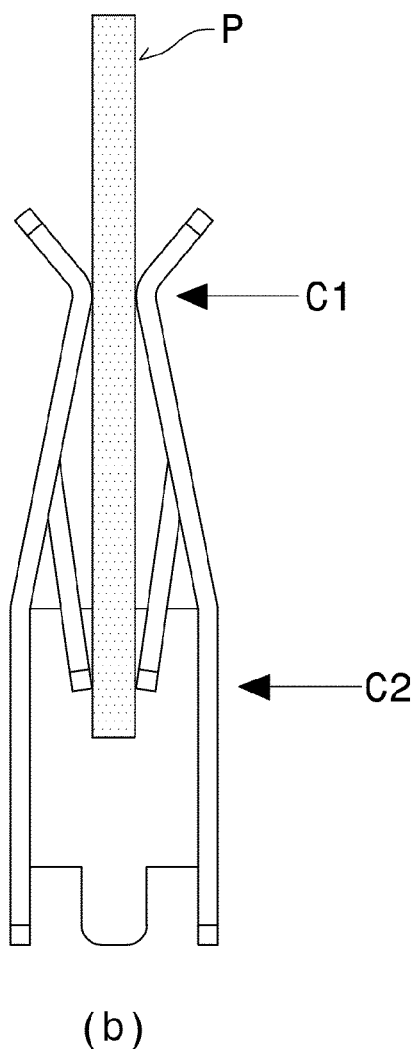
(b)

【FIG. 5】
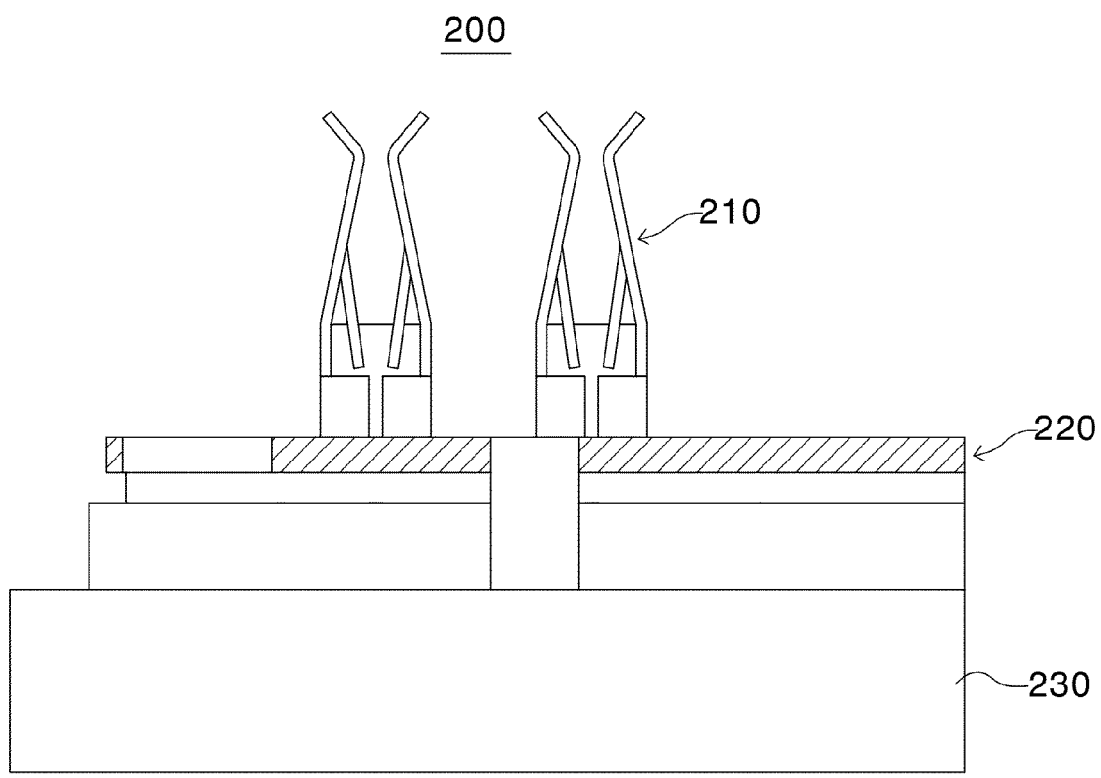

[FIG. 6]
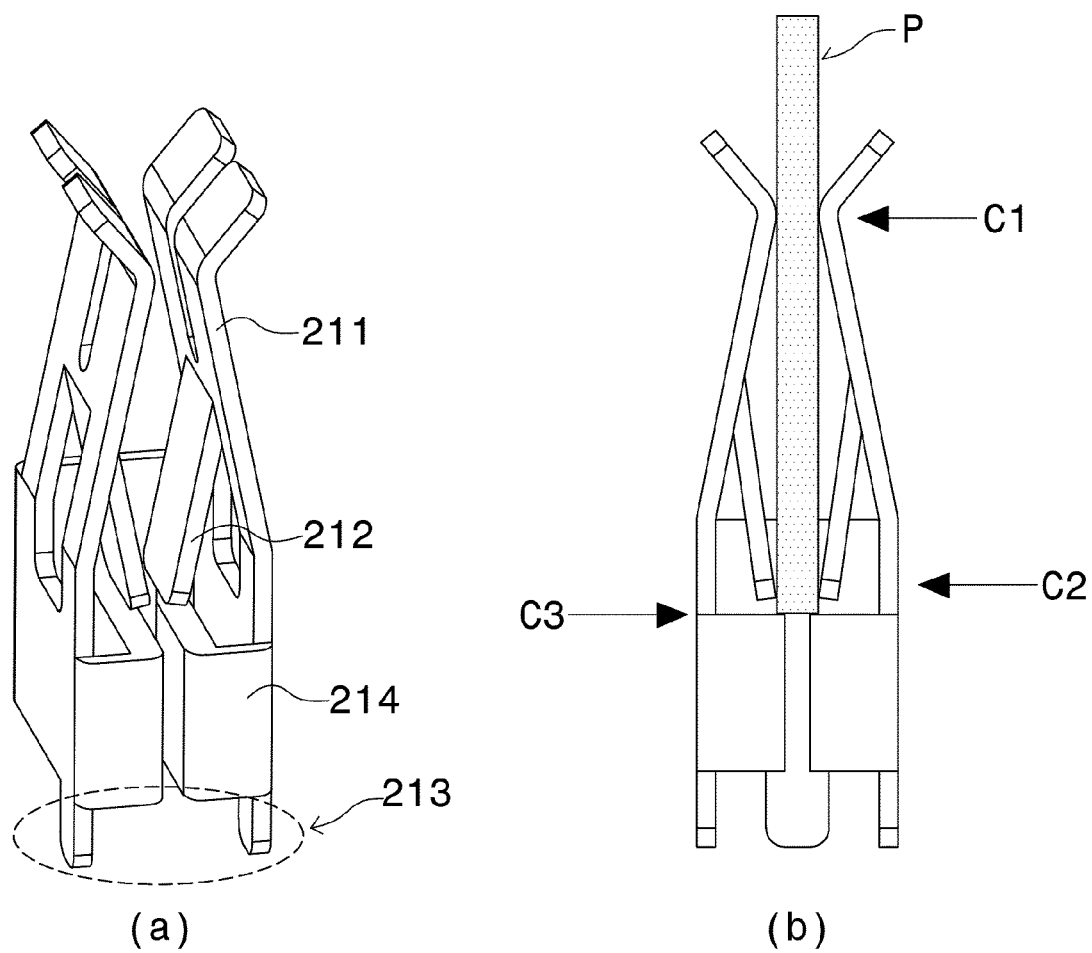
(a)　　　　　　　　　(b)

BATTERY PACK INCLUDING CLIP TYPE CONNECTOR

TECHNICAL FIELD

This application claims the benefit of priority to Korean Patent Application No. 2020-0066048 filed on Jun. 1, 2020, the disclosure of which is incorporated herein by reference in its entirety.

The present invention relates to a battery pack including a clip type connector having a plurality of contact points, whereby it is possible to prevent poor contact between the connector and a device pin inserted into the connector.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

A small battery pack applied to a device, such as a cleaner or a power tool, as an example of the battery pack, may be electrically connected to the device via a connector.

When describing a conventional connector applied to the small battery pack with reference to FIGS. 1 and 2, FIG. 1 showing a portion of a battery pack 10, including a connector 11 and a printed circuit board (PCB) 12, and FIG. 2 shows only the connector 11 of the battery pack 10 of FIG. 1 in detail. As shown in (b) of FIG. 2, the conventional connector 11 is electrically connected to a device pin P inserted into the connector while forming a single contact point C.

Even in the case in which the connector 11 is manufactured in consideration of the thickness of the device pin P inserted into the connector, however, a contact point portion of the connector may be widened due to the characteristics of a product configured to allow the device pin P to be frequently inserted thereinto and separated therefrom, whereby poor contact may occur. In the case in which poor contact occurs, contact resistance may increase, whereby a large amount of heat may be generated, and therefore a device may malfunction.

In order to inhibit occurrence of such defects, tolerance in a manufacturing process must be set to be very small, which is difficult. Furthermore, widening may occur depending on an insertion angle of the device pin P, whereby poor contact may occur.

DISCLOSURE

Technical Problem

The present invention has been made in view of the above problems, and it is an object of the present invention to provide a battery pack including a connector having a plurality of contact points at which the connector is connected to a device pin inserted into the connector.

Technical Solution

A battery pack according to the present invention to accomplish the above object includes a plurality of battery cells, a case configured to receive the plurality of battery cells therein, a connector configured to electrically connect the battery pack to a device, and a printed circuit board (PCB) configured to control operation of the battery pack, the PCB being located inside or outside the case, the connector being coupled to the PCB, wherein the connector includes a clip portion configured to form a first contact point at which the connector electrically contacts a device pin inserted into the connector and a contact arm having one side connected to the clip portion, the contact arm being configured to form a second contact point having a distance to the device pin varying in inverse proportion to a distance to the device pin at the first contact point.

Also, in the battery pack according to the present invention, the connector may further include a connection portion coupled to the PCB.

Also, in the battery pack according to the present invention, the distance to the device pin at each of the first contact point and the second contact point may be less than the thickness of the device pin inserted into the connector.

Also, in the battery pack according to the present invention, each of the clip portion and the contact arm may be elastic such that insertion and separation of the device pin are easily performed.

Also, in the battery pack according to the present invention, opposite sides of the clip portion may be bent outwards from the portion of the clip portion that forms the first contact point such that insertion and separation of the device pin are easily performed.

Also, in the battery pack according to the present invention, the connector may further include a contact plate having a third contact point at which the contact plate comes into contact with a distal end of the device pin inserted into the connector.

Also, in the battery pack according to the present invention, the contact plate may be located spaced apart from the contact arm.

In addition, a connector according to the present invention is a connector including a clip portion, a contact arm, and a connection portion, the connector being configured to electrically connect a battery pack to a device, wherein the clip portion forms a first contact point at which the connector electrically contacts a device pin inserted into the connector, the contact arm is connected to the clip portion and forms a second contact point having a distance varying in inverse proportion to the distance at the first contact point, and the connection portion is connected to a PCB of the battery pack.

Also, the connector according to the present invention may further include a contact plate having a third contact point at which the contact plate comes into contact with a distal end of the device pin inserted into the connector.

In addition, a device including the battery pack according to the present invention is a vacuum cleaner or a power tool.

Advantageous effects

A battery pack according to the present invention has an advantage in that a connector has a plurality of contact points, whereby, even in the case in which any one contact point portion is widened and thus poor contact occurs, contact is maintained at the other contact point, and therefore it is possible to prevent poor contact between the connector and a device pin.

In addition, the battery pack according to the present invention has an advantage in that the connector has a plurality of contact points, whereby it is possible to increase tolerance in a manufacturing process, and therefore it is possible to reduce a defect rate in the manufacturing process.

In addition, the battery pack according to the present invention has an advantage in that it is possible to reduce malfunction of a device due to poor contact, and therefore it is possible to improve reliability of a product.

DESCRIPTION OF DRAWINGS

FIG. 1 is a view schematically showing a portion of a conventional battery pack.

FIG. 2 is a perspective view of a conventional connector and a front view of the connector having a device pin inserted thereinto.

FIG. 3 is a view schematically showing a portion of a battery pack according to an embodiment of the present invention.

FIG. 4 is a perspective view of a connector according to an embodiment of the present invention and a front view of the connector having a device pin inserted thereinto.

FIG. 5 is a view schematically showing a portion of a battery pack according to another embodiment of the present invention.

FIG. 6 is a perspective view of a connector according to another embodiment of the present invention and a front view of the connector having a device pin inserted thereinto.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack according to the present invention will be described with reference to the accompanying drawings.

FIG. 3 is a view schematically showing a portion of a battery pack according to an embodiment of the present invention, and FIG. 4 is a perspective view of a connector according to an embodiment of the present invention and a front view of the connector having a device pin inserted thereinto.

When describing the battery pack 100 according to the present invention with reference to FIGS. 3 and 4, the battery pack 100 is configured such that a plurality of battery cells is received in a case 130, a printed circuit board (PCB) 120 configured to control operation of the batter pack 100 is located at one surface of the case 130 at the inside or the outside thereof, and a connector 110 is coupled to the PCB 120, the connector 110 being configured to electrically connect the battery pack 100 to an external device.

As shown in FIG. 4, the connector 110 includes a clip portion 111, a contact arm 112, and a connection portion 113 configured to be joined to the PCB. A device pin P is inserted, as shown in (b) of FIG. 4, to form a contact point with the clip portion 111 and the contact arm 112, whereby the connector is electrically connected to the device. At this time, it is preferable for the insertion depth of the device pin P to be equal to or greater than a depth at which the device pin forms a second contact point C2 but to be a depth at which the device pin does not reach the PCB coupled to the connection portion.

Specifically, the clip portion 111 has a pair of bars facing each other, wherein the pair of bars is connected to each other at the connection portion 113 on one side of each thereof, the distance between the bars gradually decreases toward a portion at which the clip portion forms a contact point (a first contact point) C1 together with the inserted device pin P, and the bars are bent outwards from the first contact point such that the distance between the bars increases, whereby insertion and separation of the device pin P are easily performed. In addition, a recess is formed in the middle of each bar in order to prevent slip of the inserted device pin P.

Meanwhile, the contact arm 112 is constituted by a pair of arms facing each other, wherein one side of each of the arms is connected to a corresponding one of the bars of the clip portion 111, and the other side of each of the arms extends in a direction toward the connection portion 113 such that the distance between the arms gradually decreases, whereby the contact arm forms the second contact point C2 at a tip end of the other side of each of the arms together with the device pin P.

In addition, the clip portion 111 and the contact arm 112 are connected to each other. When the distance between the bars at the first contact point increases, therefore, the distance between the arms at the second contact point decreases according to the principle of a lever. As a result, even in the case in which the distance between the bars at the first contact point increases due to repeated use of the clip portion 111 or any manufacturing defect, whereby poor contact occurs, contact at the second contact point is maintained, and therefore contact with the device is normally maintained. Consequently, it is possible to prevent malfunction of the device due to poor contact.

Meanwhile, each of the clip portion 111 and the contact arm 112 is elastic. Even in the case in which each of the distance between the bars at the first contact point C1 and the distance between the arms at the second contact point C2 is less than the thickness of the device pin P that is inserted therebetween, therefore, insertion and separation of the device pin are easily performed. Each of the distance between the bars at the first contact point C1 and the distance between the arms at the second contact point C2 may be appropriately designed in consideration of thickness of the device pin P that is inserted therebetween and tolerance.

When describing another embodiment of the present invention with reference to FIGS. 5 and 6, a connector 210 of FIGS. 5 and 6 is identical to the connector 110 of FIGS. 3 and 4 except that a contact plate 214 configured to form a third contact point C3 together with a device pin P that is inserted into the connector is further added.

When describing the connector 210 based on the contact plate 214, the contact plate 214 is located between a contact arm 212 and a connection portion 213 in the form of a plate so as to come into contact with a distal end of the device pin P that is inserted into the connector. The contact plate may be configured to have a structure in which two plates are bent in the shape of "[" and are coupled to a clip portion so as to be spaced apart from each other by a predetermined distance, as shown in FIG. 6, or to have a structure in which a single plate is connected to bars of the clip portion therebetween, although not shown in the figure. Here, it is preferable for the predetermined distance between the plates to be small to such an extent that the device pin P cannot be inserted therebetween.

As described above, the contact plate 214, which forms the third contact point C3, is added to the connector. Even in the case in which poor contact simultaneously occurs at a first contact point C1 and a second contact point C2 due to damage to or defect of the clip portion 211 and the contact arm 212, therefore, contact with the device pin P at the third contact point is maintained, whereby it is possible to prevent malfunction of the device due to poor contact.

That is, the connector according to the present invention is configured to have a structure in which several contact points are simultaneously provided in order to increase contact area, and the clip portion 111 or 211, the contact arm 112 or 212, and the contact plate 214, each of which forms a contact point, form contact points together with the device pin P in different shapes and manners, whereby, in the worst situation in which poor contact occurs at any one portion or two portions, contact is supplemented at the other portion, and therefore at least one contact point is maintained and eventually it is possible to prevent poor contact between the connector and the device, which is distinguished from a conventional connector.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS 10, 100, 200: Battery packs
11, 110, 210: Connectors
12, 120, 220: PCBs
130, 230: Cases
111, 211: Clip portions
112, 212: Contact arms
113, 213: Connection portions
214: Contact plate
P: Device pin
C: Contact point
C1: First contact point
C2: Second contact point
C3: Third contact point

The invention claimed is:

1. A battery pack comprising:
a plurality of battery cells;
a case configured to receive the plurality of battery cells therein;
a connector configured to electrically connect the battery pack to a device; and
a printed circuit board (PCB) configured to control operation of the battery pack, the PCB being located inside or outside the case, and the connector being coupled to the PCB,
wherein the connector comprises:
a clip portion configured to form a first contact point at which the connector is configured to electrically contact a device pin when the device pin is inserted into the connector; and
a pair of contact arms, each contact arm having one side connected to a portion of the clip portion, the pair of contact arms being configured to form a second contact point having a distance to the device pin varying in inverse proportion to a distance to the device pin at the first contact point,
wherein the pair of contact arms include a first contact arm connected to a first side of the clip portion and a second contact arm connected to a second side facing the first side of the clip portion,
wherein the first contact arm and the second contact arm do not directly contact each other, and
wherein as a distance between the clip portion and the device pin towards the first contact point decreases, a distance between the pair of arms and the device pin from the second contact point towards the first contact point increases.

2. The battery pack according to claim 1, wherein the connector further comprises a connection portion coupled to the PCB.

3. The battery pack according to claim 1, wherein a distance at each of the first contact point and the second contact point is less than a thickness of the device pin inserted into the connector.

4. The battery pack according to claim 3, wherein each of the clip portion and the pair of contact arms are elastic such that insertion and separation of the device pin are performed.

5. The battery pack according to claim 1, wherein opposite sides of the clip portion are bent outwards from a portion of the clip portion that forms the first contact point such that insertion and separation of the device pin are performed.

6. The battery pack according to claim 2, wherein the connector further comprises a contact plate having a third contact point at which the contact plate comes into contact with a distal end of the device pin inserted into the connector.

7. The battery pack according to claim 6, wherein the contact plate is located spaced apart from the pair of contact arms.

8. A connector comprising:
a clip portion;
a pair of contact arms; and
a connection portion,
wherein the connector is configured to electrically connect a battery pack to a device, wherein the clip portion forms a first contact point at which the connector is configured to electrically contact a device pin when the device pin is inserted into the connector, wherein the pair of contact arms are connected to a portion of the clip portion and form a second contact point having a distance varying in inverse proportion to a distance at the first contact point, wherein the connection portion is connected to a printed circuit board (PCB) of the battery pack, wherein the pair of contact arms include a first contact arm connected to a first side of the clip portion and a second contact arm connected to a second side facing the first side of the clip portion, wherein the first contact arm and the second contact arm do not directly contact each other, and wherein as a distance between the clip portion and the device pin towards the first contact point decreases, a distance between the pair of arms and the device pin from the second contact point towards the first contact point increases.

9. The connector according to claim 8, further comprising a contact plate having a third contact point at which the contact plate comes into contact with a distal end of the device pin inserted into the connector.

10. A device comprising the battery pack according to claim 1.

11. The device according to claim 10, wherein the device is a vacuum cleaner or a power tool.

12. The battery pack according to claim 1, wherein a width of each of the pair of contact arms is smaller than a width of the connector.

13. The battery pack according to claim 1, wherein a location the pair of contact arms corresponds to a location of cutouts in the connector.

14. The battery pack according to claim 1, wherein the connector comprises a straight portion and a curved portion with respect to a vertical direction.

15. The battery pack according to claim 14, wherein a first end of each of the pair of contact arms is located at a height corresponding to the curved portion of the connector with respect to the vertical direction and a second end of each of the pair of contact arms is located at a height corresponding to the straight portion of the connector with respect to the vertical direction.

16. The battery pack according to claim 1, wherein the connector further comprises a contact plate having a third contact point at which the contact plate comes into contact with a distal end of the device pin inserted into the connector, and wherein the contact plate is connected to outer portions of the clip portion.

* * * * *